United States Patent
Nakayama et al.

(10) Patent No.: US 11,078,032 B2
(45) Date of Patent: Aug. 3, 2021

(54) SUCTION DEVICE

(71) Applicant: SMC CORPORATION, Chiyoda-ku (JP)

(72) Inventors: Toru Nakayama, Soka (JP); Toru Sugiyama, Abiko (JP); Noriyuki Miyazaki, Kashiwa (JP); Masaru Saitoh, Joso (JP); Yukiya Goto, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 73 days.

(21) Appl. No.: 16/529,998

(22) Filed: Aug. 2, 2019

(65) Prior Publication Data
US 2020/0048014 A1    Feb. 13, 2020

(30) Foreign Application Priority Data
Aug. 8, 2018    (JP) .............................. JP2018-149077

(51) Int. Cl.
*B25J 15/06*    (2006.01)
*B65G 47/91*    (2006.01)

(52) U.S. Cl.
CPC .......... *B65G 47/91* (2013.01); *B25J 15/0683* (2013.01)

(58) Field of Classification Search
CPC ... B65G 47/91; B25J 15/0616; B25J 15/0683; B66C 1/0206; B66C 1/0231; B66C 1/0293
See application file for complete search history.

(56) References Cited

U.S. PATENT DOCUMENTS

| | | | | |
|---|---|---|---|---|
| 3,558,171 A | * | 1/1971 | Netsch et al. ........ | B66C 1/0212 294/186 |
| 4,078,671 A | * | 3/1978 | Lundstrom .............. | B25J 15/00 294/183 |
| 4,561,687 A | * | 12/1985 | Bostrom ............... | B66C 1/0212 198/689.1 |
| 4,717,138 A | * | 1/1988 | Watkiss ............... | B65H 3/0883 271/103 |
| 5,688,008 A | * | 11/1997 | Hansch ................ | B65H 3/0883 271/103 |

(Continued)

FOREIGN PATENT DOCUMENTS

| | | | |
|---|---|---|---|
| DE | 3324441 A1 * | 10/1984 | .......... E01C 19/524 |
| JP | 5-35973 Y2 | 9/1993 | |

*Primary Examiner* — Dean J Kramer
(74) *Attorney, Agent, or Firm* — Oblon, McClelland, Maier & Neustadt, L.L.P.

(57) ABSTRACT

A suction device includes an adapter having in the interior thereof a supply passage to which a negative pressure fluid is supplied, a bellows connected to a distal end of the adapter, and a pad member disposed at a distal end of the bellows and to which a workpiece is attracted under suction. In addition, the suction device attracts the workpiece under suction by a negative pressure fluid which is supplied to the pad member through the supply passage and the bellows. An attachment which is capable of being tilted with respect to the axis of the bellows is provided in the interior of the bellows. In the attachment, a main body portion thereof is disposed in facing relation to a suction surface of a skirt, and a shaft portion is inserted into the supply passage at a time that the workpiece is attracted under suction.

5 Claims, 7 Drawing Sheets

(56) References Cited

U.S. PATENT DOCUMENTS

| | | | |
|---|---|---|---|
| 6,612,633 B1* | 9/2003 | Tell | B65G 47/91 |
| | | | 294/186 |
| 7,017,961 B1* | 3/2006 | Parnell | B25J 15/0616 |
| | | | 294/188 |
| 10,836,048 B2* | 11/2020 | Nakayama | B65G 47/91 |
| 2002/0011735 A1* | 1/2002 | Nagai | B25J 15/0616 |
| | | | 294/189 |

* cited by examiner

SUCTION DEVICE

CROSS-REFERENCE TO RELATED APPLICATION

This application is based upon and claims the benefit of priority from Japanese Patent Application No. 2018-149077 filed on Aug. 8, 2018, the contents of which are incorporated herein by reference.

BACKGROUND OF THE INVENTION

Field of the Invention

The present invention relates to a suction device capable of attracting-under-suction and transporting a workpiece under a supply action of a negative pressure fluid.

Description of the Related Art

Heretofore, a suction device has been known for attracting-under-suction and transporting a workpiece by a supplied negative pressure fluid. In such a suction device, for example, the workpiece, which is inclined with respect to a suction pad, is attracted under suction, and in such a case, the suction pad may not be kept in close contact with the workpiece, and the negative pressure fluid does not effectively act with respect to the workpiece, thus resulting in a suction defect.

Thus, in order to solve the aforementioned problem, for example, in the suction device disclosed in Japanese Utility Model Publication No. 05-035973, a hollow connecting screw is connected to a lower end of a fixture, and a spherical ball joint is provided on the lower end. In addition, a ball support retaining the suction pad is held in a rotatable manner with respect to the ball joint. Consequently, even in the case that the workpiece is inclined with respect to the suction pad, by the suction pad being tilted together with the ball support via the ball joint, the suction pad can be placed in close contact with the workpiece and attract the workpiece under suction.

SUMMARY OF THE INVENTION

In the suction device described above, for example, in the case of conveying a workpiece that is formed from a film in a bag-like shape and is filled with fluid contents, the contents may undergo movement due to inertia acting at a time when the workpiece is transported, and accompanying such movement, the workpiece may swing with respect to the suction pad. Consequently, for example, in the case that the inertial force acting on the workpiece is large relative to the suction force by the suction pad, the workpiece undergoes slippage with respect to the suction pad and a positional deviation occurs, or in the case that the workpiece is transported at a high speed, there is a concern that the workpiece may be dropped from the suction pad.

A general object of the present invention is to provide a suction device which is capable of reliably preventing positional deviation and dropping of a workpiece at a time that the workpiece is transported.

An aspect of the present invention is characterized by a suction device, comprising a body having in the interior thereof a passage to which a negative pressure fluid is supplied, a bellows connected to an end of the body, and a suction member disposed at an end of the bellows and to which a workpiece is attracted under suction, wherein the suction device attracts the workpiece under suction by a negative pressure fluid which is supplied to the suction member through the passage and the bellows;

wherein a tilting member which is capable of being tilted with respect to an axis of the bellows is provided in the interior of the bellows, and in the tilting member, one end thereof along an axial direction is disposed in facing relation to a suction surface on the suction member that is adapted to attract the workpiece, and another end thereof is inserted into the passage at a time that the workpiece is attracted under suction, together with being equipped in the interior thereof with a flow path communicating with the suction surface and through which the negative pressure fluid flows.

According to the present invention, in the suction device, the tilting member which is capable of being tilted with respect to the axis of the bellows is disposed in the interior of the bellows which is provided between the body and the suction member, and in the tilting member, one end thereof along the axial direction is disposed in facing relation to the suction surface on the suction member that attracts the workpiece, and another end thereof is inserted into the passage at a time that the workpiece is attracted under suction, together with being equipped in the interior thereof with the flow path communicating with the suction surface and through which the negative pressure fluid flows.

Accordingly, when a workpiece in which fluid contents are accommodated is attracted under suction and transported by the suction device, even in the case that the contents undergo movement due to the inertial force acting with respect to the workpiece, and the shape of the workpiece (the position of the center of gravity) is changed, the tilting member can be made to respond to such a situation by undergoing tilting inside the bellows in following relation to the change in the position of the center of gravity of the workpiece, together with the amount of tilting being regulated by the other end coming into abutment against the body inside the passage.

As a result, during conveyance of the workpiece which is attracted under suction by the suction device, even in the case that the inertial force acts with respect to the workpiece and the shape and the position of the center of gravity change, due to the tilting operation of the tilting member, it is possible to reliably prevent dropping off or positional deviation of the workpiece with respect to the suction device, and the workpiece can be transported to a predetermined position while reliably maintaining the attracted state of the workpiece.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A suction device 10, as shown in FIGS. 1 to 4, includes an adapter (body) 12 connected through piping to a non-illustrated negative pressure supply device, a bellows 14 connected to a lower end of the adapter 12, a pad member (suction member) 16 formed at a lower end (distal end) of the bellows 14, and an attachment (tilting member) 18 accommodated in the interior of the bellows 14 and the pad member 16.

Figure 1:
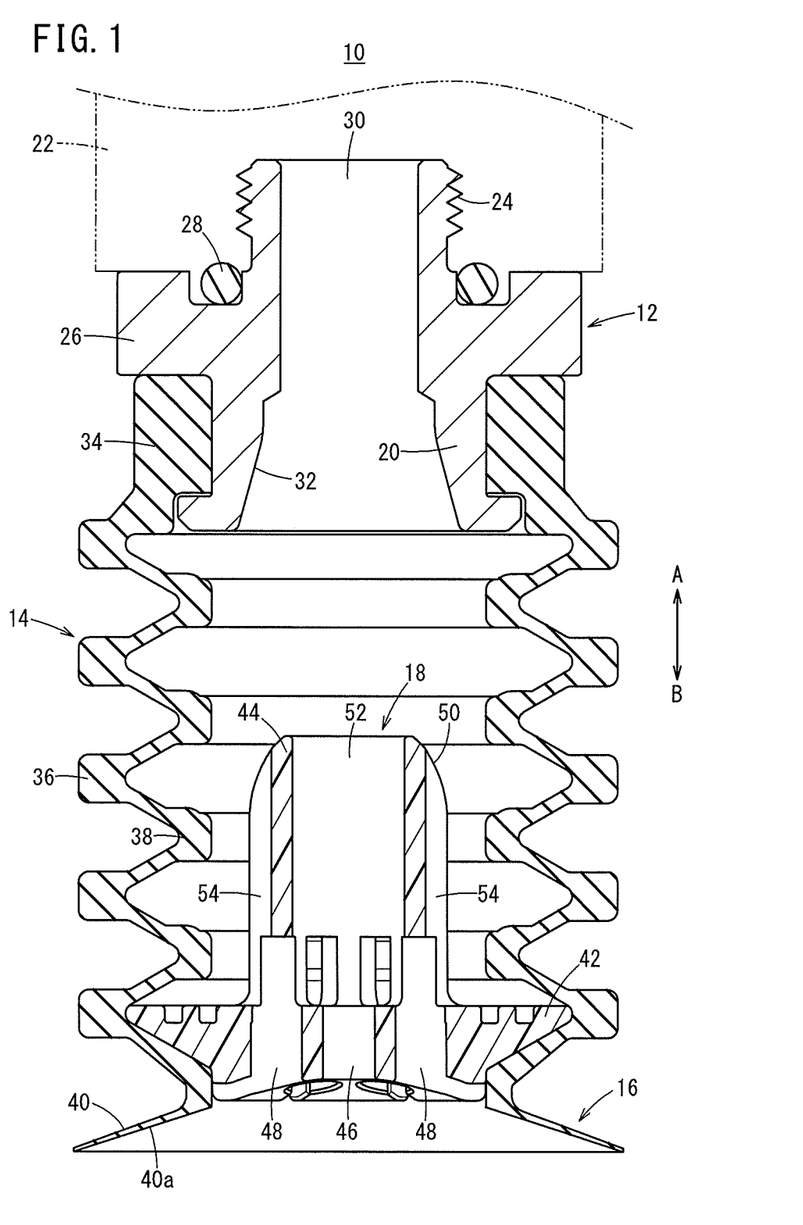
FIG. 1 is an overall cross-sectional view of a suction device according to a first embodiment of the present invention.

The adapter 12 is formed, for example, in a cylindrical shape from a metal material, and on a lower end thereof, a connecting part 20 is formed to which the bellows 14 is connected, whereas on an upper end thereof, a threaded portion 24 is formed to which a joint 22 is connected. Between the connecting part 20 and the threaded portion 24 in the adapter 12, a flange member 26 is formed that projects in a direction perpendicular to the axial direction (the direction of arrows A and B).

In addition, a seal ring 28 is attached to the flange member 26 via an annular groove on an end surface on the side of the threaded portion 24 (in the direction of the arrow A). Moreover, when the joint 22 is connected with respect to the adapter 12, the joint 22 abuts against the seal ring 28, thereby preventing the negative pressure fluid from leaking between the two members.

Further, a supply passage (passage) 30 is formed in the interior of the adapter 12 along the axial direction (the direction of arrows A and B) so as to penetrate through the connecting part 20, the flange member 26, and the threaded portion 24. The negative pressure fluid, which is supplied from the negative pressure supply device (not shown) through the piping and the joint 22 connected to the threaded portion 24, is supplied to the supply passage 30. Furthermore, in the supply passage 30, a tapered portion 32 having a diameter that gradually expands toward the side of the bellows 14 (in the direction of the arrow B) which is located downward therefrom is formed at a position on an inner side of the connecting part 20.

The bellows 14 is formed in a cylindrical shape, for example, from elastic rubber or the like, and has an expandable/contractible and bendable bellows structure in the axial direction. A cylindrical portion 34 which is formed in a cylindrical shape with a constant diameter is included on the upper end of the bellows 14, and by being mounted in a manner so as to cover the connecting part 20 of the adapter 12, the cylindrical portion 34 is connected coaxially with respect to the lower end of the adapter 12.

Further, annular peak portions 36 that are expanded in diameter and annular valley portions (inner circumferential portions) 38 that are contracted in diameter are formed alternately along the axial direction (the direction of arrows A and B) on the bellows 14. The pad member 16, which is placed in contact with respect to the workpiece W (see FIGS. 3 and 4) and applies suction thereto, is formed integrally on the lower end of the bellows 14.

Moreover, the interior of the bellows 14 which is formed in a hollow shape functions as a flow path through which the negative pressure fluid is supplied and circulated, and under a supply action of the negative pressure fluid, is contracted in the axial direction toward the side of the adapter 12 (in the direction of the arrow A).

The pad member 16 includes a skirt 40 provided on the lower end of the bellows 14. The skirt 40 is formed, for example, in a thin film annular shape from rubber or the like having an elasticity similar to that of the bellows 14, and is formed so as to spread out obliquely downward (in the direction of the arrow B), together with being formed to be freely flexible. In addition, on the skirt 40, the distal end thereof is a location that is placed in contact with respect to the workpiece W (see FIG. 3). Moreover, the skirt 40 may be formed by way of two-color molding or the like using a material that differs from that of the bellows 14.

The attachment 18, for example, is formed of a resin material, and includes a main body portion 42 engaged with a distal end of the bellows 14 on the side of the pad member 16 (in the direction of the arrow B), and a shaft portion 44 which extends from the center of the main body portion 42 toward the side of the adapter 12 (in the direction of the arrow A). The main body portion 42 and the shaft portion 44 are formed in a straight line shape along the axial direction (in the direction of arrows A and B) of the suction device 10.

The main body portion 42 is formed in a conical shape which is gradually expanded in diameter toward the side of the shaft portion 44 (in the direction of the arrow A) from one end side thereof on the side of the pad member 16, and is engaged with the inner side of the lowermost (in the direction of the arrow B) annular peak portion 36 in the bellows 14, and is thereby held integrally in the center of the lower end of the bellows 14.

Further, the center on the one end of the main body portion 42 is formed with an arcuate shape in cross section which is of a concave shape in a direction (the direction of the arrow A) separating away from the workpiece W, and includes a first communication hole 46 opened at the center, and a plurality of second communication holes 48 opened on the outer circumferential side of the first communication hole 46. In addition, the first and second communication holes 46 and 48 are formed to penetrate through the main body portion 42 in the axial direction (the direction of arrows A and B).

Figure 2:
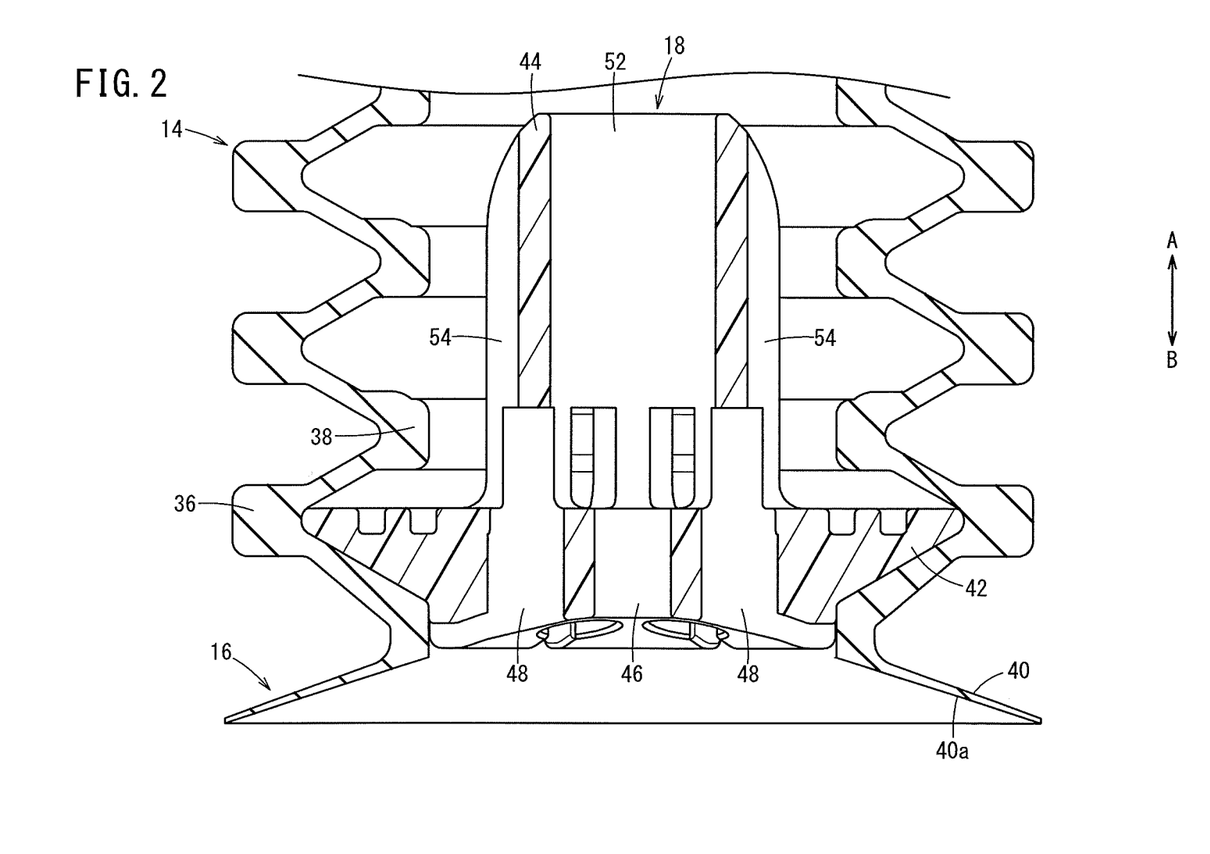
FIG. 2 is an enlarged cross-sectional view in the vicinity of a pad member and an attachment in the suction device of FIG. 1.

As shown in FIGS. 1 and 2, the shaft portion 44 is accommodated in the interior of the bellows 14 at a time that the negative pressure fluid is not being supplied and the workpiece W is not attracted under suction, is disposed at a predetermined distance in the radial direction with respect to the annular valley portions 38 of the bellows 14, and is formed so as to project in the axial direction at a predetermined length from the center of the main body portion 42.

Figure 3:
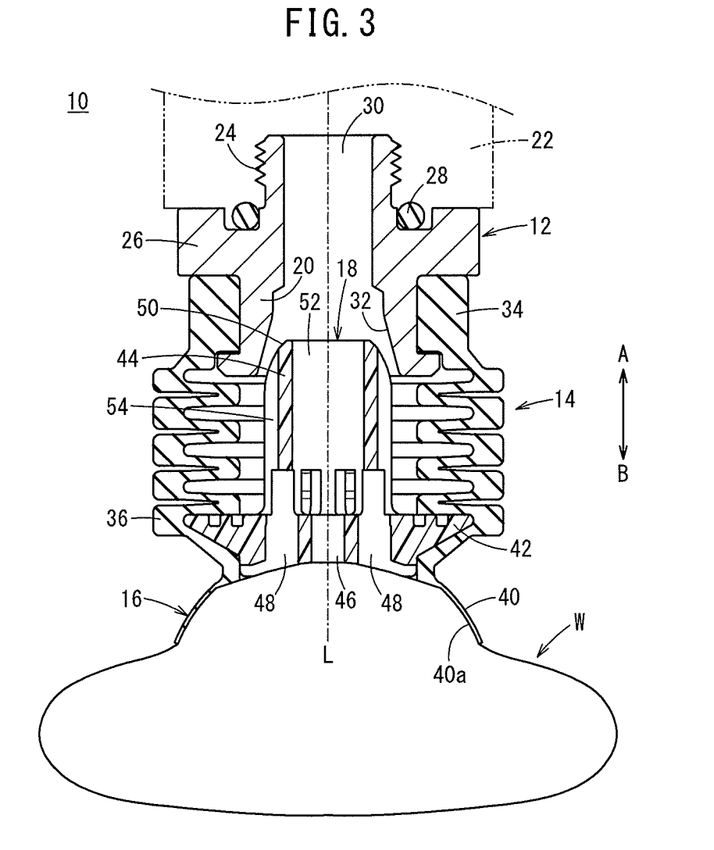
FIG. 3 is an explanatory drawing of operations, showing a state in which a workpiece is attracted under suction and moved upwardly by the suction device of FIG. 1.
Figure 4:
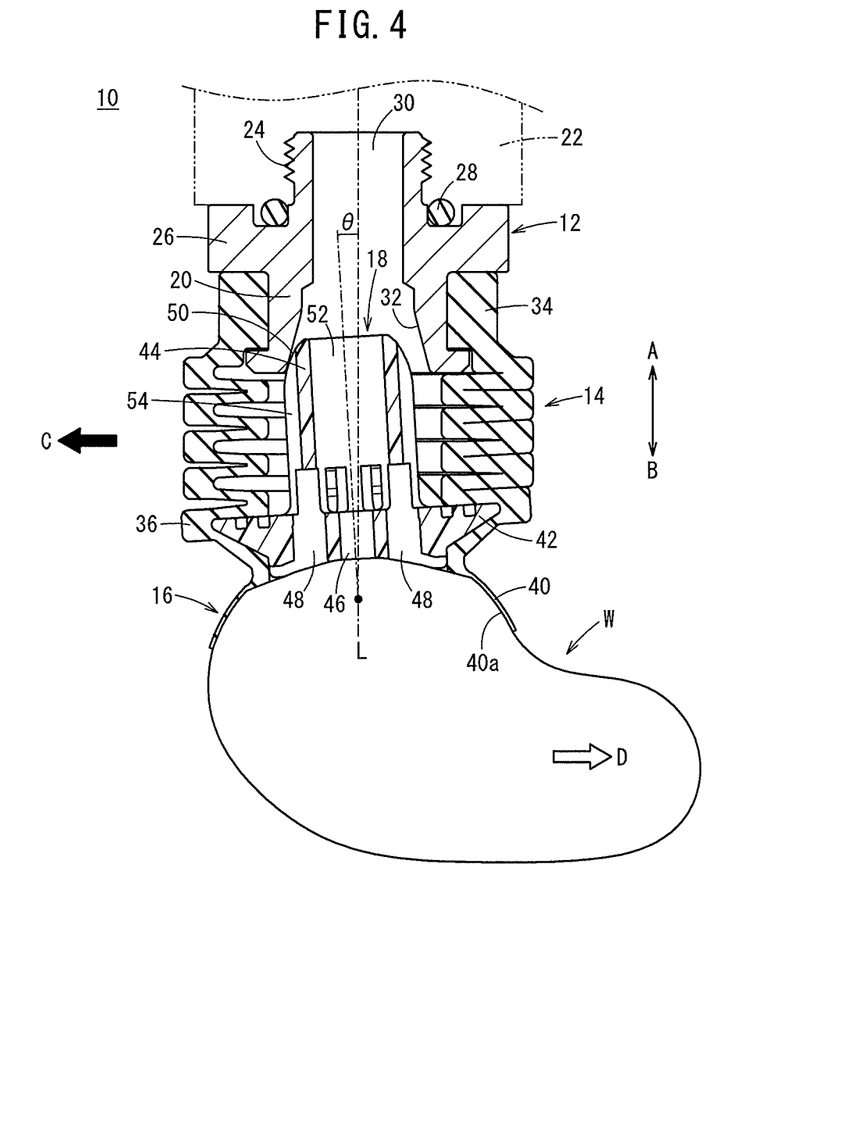
FIG. 4 is an explanatory drawing of operations, showing a state in which inertia acts on the workpiece and the workpiece is swung during conveyance thereof in the suction device of FIG. 3.

Further, a spherical surface 50 which is formed in a substantially spherical shape is formed at the upper end of the shaft portion 44, and as shown in FIGS. 3 and 4, at a time that the workpiece W to which the negative pressure fluid is supplied is attracted under suction, by the bellows 14 being contracted in the axial direction (in the direction of the arrow A), the upper end is inserted into the supply passage 30 of the adapter 12, and the spherical surface 50 is placed in a position facing toward the tapered portion 32.

Furthermore, a through hole 52 that penetrates along the axial direction (the direction of arrows A and B) is formed in the center of the shaft portion 44, and the first communication hole 46 and the interior of the bellows 14 communicate via the through hole 52.

Further, on the outer circumferential surface of the shaft portion 44, a plurality of communication grooves 54 are formed which are recessed toward the inner side in the radial direction. The communication grooves 54 extend along the axial direction, and allow communication between the interior of the bellows 14 and the second communication holes 48 of the main body portion 42.

In addition, in the interior of the bellows 14 and the pad member 16, the attachment 18 is disposed so as to be capable of being tilted at a predetermined angle θ (see FIG. 4) with respect to the axis L of the suction device 10.

The suction device 10 according to the first embodiment of the present invention is constructed basically as described above. Next, operations and advantages thereof will be described. In this instance, as shown in FIGS. 3 and 4, a description will be given concerning a case in which a workpiece W formed of a thin film in a bag-like shape and in which fluid contents are contained in the interior thereof is attracted under suction and transported.

First, the suction device 10 is attached to an arm or the like of a non-illustrated transport apparatus, and is disposed in a movable manner, together with the adapter 12 being connected via piping and the joint 22 to a non-illustrated negative pressure supply device.

After having completed such preparatory operations, based on an operation of the arm of the non-illustrated transport apparatus, the suction device 10 is displaced downward (in the direction of the arrow B), and the skirt 40 is placed in close contact with respect to an upper part of the workpiece W that has been placed on a floor surface or the like, together with supplying a negative pressure fluid from the non-illustrated negative pressure supply device to the supply passage 30 of the adapter 12 via the piping and the joint 22.

At this time, even in the case that the workpiece W is inclined, or when the upper part of the workpiece W is not flat, by an expanding/contracting operation of the bellows 14 corresponding to the workpiece W, and by the pad member 16 being elastically deformed, it is possible to follow the inclination and the like of the workpiece W and to securely place the pad member 16 in close contact therewith.

In addition, the skirt 40 or the pad member 16 is placed in close contact with the surface of the workpiece W, and the negative pressure fluid supplied to the supply passage 30 of the adapter 12 passes through the interior of the bellows 14, and is supplied to the internal space of the pad member 16 from the through hole 52 and the communication grooves 54 of the attachment 18, and through the first and second communication holes 46 and 48.

Consequently, as shown in FIG. 3, by the negative pressure fluid supplied between the suction surface 40a of the skirt 40 and the workpiece W, the upper part of the workpiece W is deformed and attracted under suction in a convex shape upwardly along the skirt 40 and the lower end of the main body portion 42 of the attachment 18, while at the same time, the bellows 14 is contracted upwardly along the axial direction (in the direction of the arrow A), and the upper end of the attachment 18 is inserted into the supply passage 30 of the adapter 12.

Then, as shown in FIG. 3, in a state in which the workpiece W is attracted under suction by the suction device 10, by causing the workpiece W to be moved upwardly (in the direction of the arrow A) by the arm of the non-illustrated transport apparatus, the workpiece W becomes deformed so as to bend downward in the direction of gravity (the direction of the arrow B) due to the weight of the contents thereof, and accordingly, the skirt 40 elastically deforms in following relation to the shape of the upper part of the workpiece W that is attracted under suction, and becomes a downwardly bent curved shape.

The suction device 10 to which the workpiece W has been attracted under suction is moved in a substantially horizontal direction, for example, by a transport device, and is transported to a predetermined position. At this time, as shown in FIG. 4, the contents in the interior of the workpiece W undergo movement due to the inertia generated in a direction (the direction of the arrow D) opposite to the conveyance direction (the direction of the arrow C) of the suction device 10 (workpiece W) during conveyance thereof. Accompanying such movement, the position of the center of gravity changes simultaneously with the deformation of the bag-like workpiece W.

More specifically, when the inertial force acts on the workpiece W, the position of the center of gravity of the workpiece W that is not attracted under suction by the suction device 10 is moved in the direction in which inertia acts (in the direction of the arrow D), and the lower part of the workpiece W undergoes deformation in the direction in which inertia acts.

Accompanying the deformation (change in the position of the center of gravity) of the workpiece W, the skirt 40 is further elastically deformed in the direction (the direction of the arrow D) in which inertia acts, and together therewith, in a state in which the main body portion 42 of the attachment 18 has attracted the workpiece W under suction, the attachment 18 is tilted so as to be inclined at a predetermined angle θ in the movement direction of the workpiece W (the direction in which inertia acts) with respect to the axis L of the suction device 10. Further, along with tilting of the attachment 18, the bellows 14 on a side in the direction in which inertia acts (the direction of the arrow D) is further compressed in the axial direction, and on a side in the direction opposite to the direction in which inertia acts, i.e., in the direction of movement of the suction device 10 (the direction of the arrow C), the bellows 14 is deformed so as to expand slightly in the axial direction.

Consequently, together with the pad member 16 and the attachment 18, the bellows 14 is also slightly inclined with respect to the axis L of the suction device 10.

In the foregoing manner, even in the case that the position of the center of gravity of the workpiece W moves and the shape thereof changes, the pad member 16 to which the workpiece W is attracted under suction and the attachment 18 can be suitably moved in following relation to the direction (the direction of arrow D) in which the inertial force acts. Therefore, it is possible to reliably maintain a state in which the pad member 16 and the attachment 18 are kept in close contact with the upper part of the workpiece W and the workpiece W is attracted under suction, and the workpiece W is prevented from slipping and being deviated in position or falling off from the predetermined suction position on the pad member 16 due to the inertial force acting on the workpiece W during conveyance thereof.

Further, when the workpiece W undergoes deformation due to the inertia acting during conveyance thereof and the attachment 18 is tilted, the spherical surface 50 of the shaft portion 44 comes into contact with the tapered portion 32 of the adapter 12, whereby a further tilting operation is restricted. Therefore, the amount of movement (amount of deformation) of the workpiece W due to inertia can be suppressed and maintained. Stated otherwise, by causing the attachment 18 to be tilted and enabling the workpiece W to be capable of swinging, it is possible to absorb the inertial force that acts on the workpiece W.

In addition, after the workpiece W has reached a predetermined position, supply of the negative pressure fluid to the supply passage 30 is stopped, whereby the attracted state of the workpiece W by the pad member 16 of the suction device 10 is released.

In the manner described above, according to the first embodiment, the attachment 18 is accommodated in a tiltable manner inside the bellows 14 that constitutes the suction device 10, and the main body portion 42, which is disposed at one end of the attachment 18, is disposed in facing relation to the suction surface 40a of the pad member 16, whereas the shaft portion 44, which is formed at the other end, is capable of being inserted into the supply passage 30 of the adapter 12 at the time that the workpiece W is attracted under suction.

Accordingly, in the case that a bag-like workpiece W in which fluid contents are accommodated is attracted under suction by the suction device 10 and the attachment 18 is tilted, even in the case that the contents are moved by the inertial force applied to the workpiece W, and the position of the center of gravity and the shape of the workpiece W are changed, the skirt 40 of the pad member 16 undergoes elastic deformation, while at the same time, the attachment 18 is inclined within the bellows 14, whereby it is possible to be responsive to changes in shape in following relation to changes in the position of the center of gravity of the workpiece.

As a result, even in the case that a large inertial force acts with respect to the workpiece W while transporting the workpiece W which is attracted under suction by the suction device 10, since the pad member 16 can be kept in close contact with respect to the workpiece W and the state of being attracted under suction can be maintained, it is possible to reliably prevent dropping off or positional deviation of the workpiece W with respect to the pad member 16, and the workpiece W can be transported to a predetermined position while reliably maintaining the attracted state of the workpiece W.

Further, the shaft portion 44 of the attachment 18 includes the spherical surface 50 that can be brought into abutment with the tapered portion 32 of the supply passage 30 of the adapter 12. Therefore, when the spherical surface 50 abuts against the tapered portion 32 due to the inertial force acting on the workpiece W, a further tilting operation of the attachment 18 can be restricted. As a result, an excessive change in the shape of the workpiece W due to inertia, and excessive movement in the direction in which inertia acts can be suitably prevented.

Furthermore, by providing the plurality of communication grooves 54 on the outer circumferential surface of the shaft portion 44 of the attachment 18, as compared to a case of supplying the negative pressure fluid to the pad member 16 solely through the through hole 52, of the negative pressure fluid that is supplied to the interior of the bellows 14, the amount thereof that is supplied to the pad member 16 can be increased, and therefore, in the pad member 16, the ability to attract the workpiece W under suction can be enhanced.

Further still, one end (the lower end) of the main body portion 42 in the attachment 18 is formed with a curved surface having an arcuate shape in cross section which is of an upwardly directed concave shape, and thus, when the workpiece W is attracted under suction, the workpiece W can be prevented from being drawn into the first and second communication holes 46 and 48, and the occurrence of a suction defect can be reliably avoided.

Still further, in the suction device 10, by providing the shaft portion 44 of the attachment 18 in the interior of the bellows 14, even in the case that the workpiece W is swung by inertia and the bellows 14 is inclined with respect to the axis L of the suction device 10, by the annular valley portions 38 coming into contact with the shaft portion 44 of the attachment 18, further deformation of the bellows 14 is restricted. More specifically, by providing the shaft portion 44 of the attachment 18, it is possible to suppress the amount of deformation of the bellows 14 when the workpiece W is swung, in comparison with a case in which the shaft portion 44 is not provided. Moreover, a clearance in the radial direction between the shaft portion 44 and the annular valley portions 38 in the bellows 14 may be appropriately set to such an extent that the two members do not come into contact with each other.

Further, in the manner described above, by providing a configuration in which it is possible to prevent deformation of the bellows 14 during conveyance of the workpiece W, deformation of the pad member 16 is also suppressed, and along therewith, it is possible to prevent positional deviation of the workpiece W with respect to the pad member 16.

Figure 5:
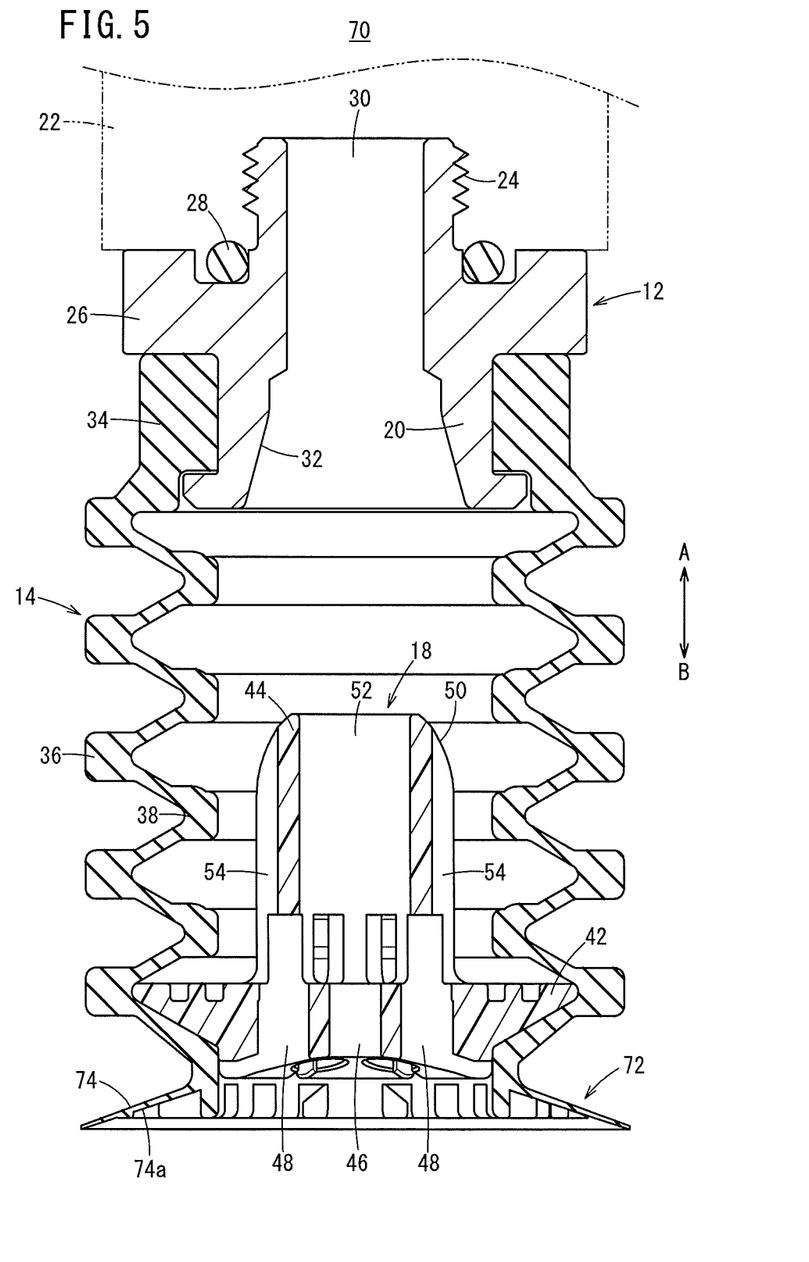
FIG. 5 is an overall cross-sectional view of a suction device according to a second embodiment of the present invention.
Figure 6:
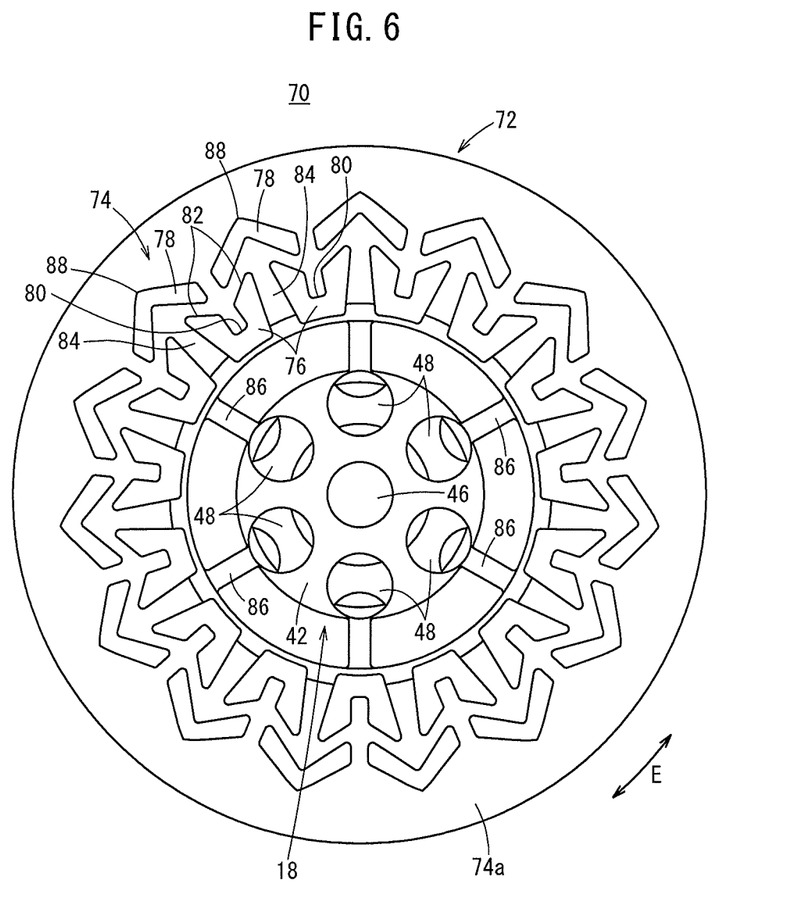
FIG. 6 is a front view of the suction device as viewed from the side of the pad member of FIG. 5.
Figure 7:
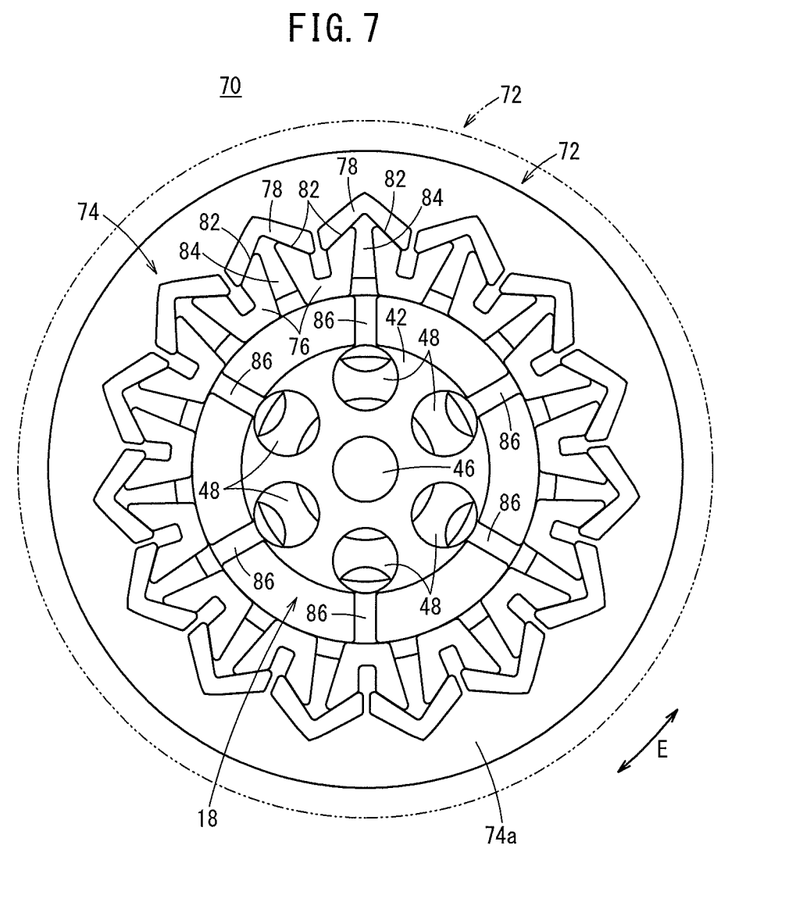
FIG. 7 is a front view of the pad member in a state in which the workpiece is attracted under suction in the suction device of FIG. 6.

Next, a suction device 70 according to a second embodiment is shown in FIGS. 5 to 7. The same reference numerals are used to indicate the same constituent elements as those of the suction device 10 according to the above-described first embodiment, and detailed description of such features is omitted.

The suction device 70 according to the second embodiment differs from the suction device 10 according to the first embodiment, in that, in a pad member 72, a plurality of first and second ribs 76 and 78 are provided on a suction surface 74a of a skirt 74 for attracting the workpiece W under suction.

In the suction device 70, as shown in FIGS. 5 to 7, on the skirt 74 that constitutes the pad member 72, on the suction surface 74a on the side of the workpiece W (in the direction of the arrow B), there are provided a plurality of first ribs 76 formed in facing relation to an outer edge part of the main body portion 42 of the attachment 18, and a plurality of second ribs 78 disposed on an outer circumferential side with respect to the first ribs 76.

The first and second ribs 76 and 78 are formed so as to project at a predetermined height, respectively, toward the side of the workpiece W with respect to the suction surface 74a of the skirt 74. A case will be described in which fifteen individual instances of the first and second ribs 76 and 78 are provided respectively on the skirt 74.

As shown in FIG. 6, the first ribs 76 are formed with V-shapes in cross section having bottom portions on the inner circumferential side and opening toward the outer circumferential side of the skirt 74 as viewed from the axial direction of the suction device 70. At bifurcated outer circumferential side end portions on the outer circumferential side, inclined portions 82 are formed which are inclined toward the central recesses 80. More specifically, each of the first ribs 76 is formed in a manner so that one of the inclined portions 82 and the other of the inclined portions 82 form a pair in a symmetrical shape with the recess 80 being interposed therebetween.

Additionally, the plurality of first ribs 76 are arranged at equal intervals from one another along the circumferential direction (the direction of the arrow E) of the skirt 74, and supply paths 84 are formed to which the negative pressure fluid is supplied between each of two adjacent ones of the first ribs 76. The first ribs 76 and the supply paths 84 extend radially along radial directions of the skirt 74.

Further, guide grooves 86 of the attachment 18 are disposed in facing relation on inner sides of the first ribs 76 and the supply paths 84.

As shown in FIG. 6, the second ribs 78 are formed with V-shapes in cross section, which are bent to project toward the outer circumferential side of the skirt 74 as viewed from the axial direction of the suction device 70. Among two of the first ribs 76, which are arranged adjacent to each other, each of the second ribs 78 is arranged so as to straddle over an outer circumferential side end portion of one of the first ribs 76 and an outer circumferential side end portion of another of the first ribs 76.

More specifically, concerning the second ribs 78, central portions thereof, which face toward the supply paths 84 formed between adjacent ones of the first ribs 76, make up top portions 88 that project maximally toward the outer circumferential side of the skirt 74, and from the top portions 88 toward both ends thereof, the second ribs 78 are formed in an inclined manner toward inner sides in radial directions, respectively, so as to gradually approach toward the outer circumferential side end portions of the first ribs 76.

The angles of inclination centered about the top portions 88 of the second ribs 78 are formed to be substantially the same as the angles of inclination of the inclined portions 82 on the first ribs 76.

Next, a description will be given concerning a case in which the workpiece W is attracted under suction by the above-described suction device 70. In this instance as well, a description will be given concerning a case in which the workpiece W, which is formed of a thin film in a bag-like shape and in which fluid contents are contained in the interior thereof, is attracted under suction and transported.

First, with respect to the suction device 70, the negative pressure fluid is supplied to the supply passage 30 of the adapter 12 via the piping and the joint 22 from the non-illustrated negative pressure supply device, and by placing the skirt 74 of the pad member 72 in close contact with the surface of the workpiece W, the negative pressure fluid supplied to the supply passage 30 of the adapter 12 passes through the interior of the bellows 14, and is supplied to the internal space of the pad member 72 from the first and second communication holes 46 and 48 of the attachment 18. In addition, a portion of the negative pressure fluid supplied to the second communication holes 48 passes through the guide grooves 86 and flows to the side of the skirt 74 on the outer circumferential side thereof, and flows to the outer circumferential side along the respective supply paths 84.

As a result, the upper part of the workpiece W that is placed in close contact with the skirt 74 is attracted under suction to the pad member 72 by the negative pressure fluid, and simultaneously, the bellows 14 undergoes contraction in the axial direction. At this time, since the outer edge part of the skirt 74 is held in close contact with the flat shaped upper part of the workpiece W, the negative pressure fluid supplied to the outer circumferential side along each of the supply paths 84 does not leak to the exterior, and the suction force applied with respect to the workpiece W is maintained.

Further, in the case that the shape of the workpiece W changes due to movement of the contents during conveyance of the workpiece W, then as shown in FIG. 7, accompanying the elastic deformation of the skirt 74, the plurality of first ribs 76 approach toward each other in the circumferential direction (the direction of the arrow E), and the second ribs 78 approach toward the sides on the outer circumferential side end portions of the first ribs 76 and come into abutment against the outer circumferential side end portions, together with the first ribs 76 and the second ribs 78 approaching toward each other in the radial direction, whereby a state is brought about in which the outer circumferential sides of the supply paths 84 are blocked by the second ribs 78.

Furthermore, accompanying the elastic deformation of the skirt 74, by both ends of the second ribs 78 undergoing bending so as to approach toward each other, the second ribs 78 abut against the inclined portions 82 of the first ribs 76 and thereby block the supply paths 84.

Therefore, the negative pressure fluid, which is supplied toward the outer circumferential side through each of the supply paths 84 in the skirt 74, does not flow any further toward the outer circumferential side from the supply paths 84 due to the presence of the second ribs 78, and the negative pressure fluid is retained within the supply paths 84 that are surrounded by the second ribs 78 and the first ribs 76, whereby the deformed upper part of the workpiece W is reliably and suitably attracted under suction by the negative pressure fluid that is retained inside the respective supply paths 84.

Further, even in the case that the lower surface of the attachment 18 is covered by the attracted workpiece W, the negative pressure fluid is securely supplied to the respective supply paths 84 of the skirt 74 by the guide grooves 86 that communicate with the second communication holes 48 and extend toward the outer circumferential side, thereby enabling the suction force applied with respect to the workpiece W to be maintained.

In the foregoing manner, according to the second embodiment, a plurality of first and second ribs 76 and 78 which project toward the workpiece W are provided on the suction surface 74a of the pad member 72 that makes up the suction device 70. In accordance with this feature, even in the case that the shape of the workpiece W is changed during conveyance thereof, the second ribs 78 cover the outer circumferential side end portions of the first ribs 76 accompanying the elastic deformation of the skirt 74, and can thereby prevent leakage of the negative pressure fluid by blocking the outer sides of the respective supply paths 84. Therefore, since the negative pressure fluid can be reliably maintained in a state in which the skirt 74 is in close contact with respect to the workpiece W, the suction force with respect to the workpiece W can be maintained, and the workpiece W can continue being reliably attracted under suction in a stable manner.

Furthermore, even in the case that an inertial force acts with respect to the workpiece W when the workpiece W is transported, the attachment 18 is caused to tilt with respect to the axis in the interior of the bellows 14, and can be made to correspond to the change in shape in following relation to the change in the position of the center of gravity of the workpiece W, and by the pad member 72 always being kept in a state of being attracted under suction in close contact with respect to the workpiece W, dropping off or positional deviation of the workpiece W can be reliably prevented, and it is possible to transport the workpiece W to a predetermined position while maintaining the attracted state thereof.

The suction device according to the present invention is not limited to the embodiments described above. It is a matter of course that various alternative or additional configurations could be adopted therein without departing from the essence and gist of the present invention as set forth in the appended claims.

What is claimed is:

1. A suction device, comprising:

a body having in the interior thereof a passage to which a negative pressure fluid is supplied, a bellows connected to an end of the body, and a suction member disposed at an end of the bellows and to which a workpiece is attracted under suction, wherein the suction device attracts the workpiece under suction by the negative pressure fluid which is supplied to the suction member through the passage and the bellows;

wherein a tilting member which is capable of being tilted with respect to an axis of the bellows is provided in the interior of the bellows, and in the tilting member, one end thereof along an axial direction is disposed in facing relation to a suction surface on the suction member that is adapted to attract the workpiece, and another end thereof is inserted into the passage at a time that the workpiece is attracted under suction, together with being equipped in the interior thereof with a flow path communicating with the suction surface and through which the negative pressure fluid flows, wherein the suction surface of the suction member comprises a plurality of ribs that project toward a side of the workpiece, wherein the ribs comprise:

first ribs formed on an inner circumferential side on the suction surface; and second ribs provided on an outer circumferential side with respect to the first ribs, and wherein each of the first ribs has a bottom portion on the inner circumferential side and is formed with a V-shape in cross section opening toward the outer circumferential side, and each of the second ribs has a bottom portion on the outer circumferential side and is formed with a V-shape in cross section opening toward the inner circumferential side, and among two of the first ribs, which are arranged adjacent to each other in a circumferential direction of the suction surface, each of the second ribs is arranged so as to straddle over an outer circumferential side end portion of one of the first ribs and an outer circumferential side end portion of another of the first ribs.

2. The suction device according to claim 1, wherein the other end of the tilting member includes a spherical surface formed in a substantially spherical shape, and which is capable of contacting an inner circumferential surface of the passage.

3. The suction device according to claim 2, wherein the passage includes a tapered portion adapted to gradually expand in diameter toward a side of the bellows, and the spherical surface contacts the tapered portion.

4. The suction device according to claim 2, wherein the one end side of the tilting member is engaged with the end of the bellows.

5. The suction device according to claim 4, further comprising a shaft portion adapted to extend along the axial direction on the other end side of the tilting member, the shaft portion being disposed at a predetermined distance with respect to an inner circumferential part of the bellows.

* * * * *